Sept. 1, 1959 W. R. COWAN 2,902,297
PRESSURE TESTING ADAPTOR
Filed Jan. 4, 1956 2 Sheets-Sheet 1

INVENTOR
Willard R. Cowan
ATTORNEY

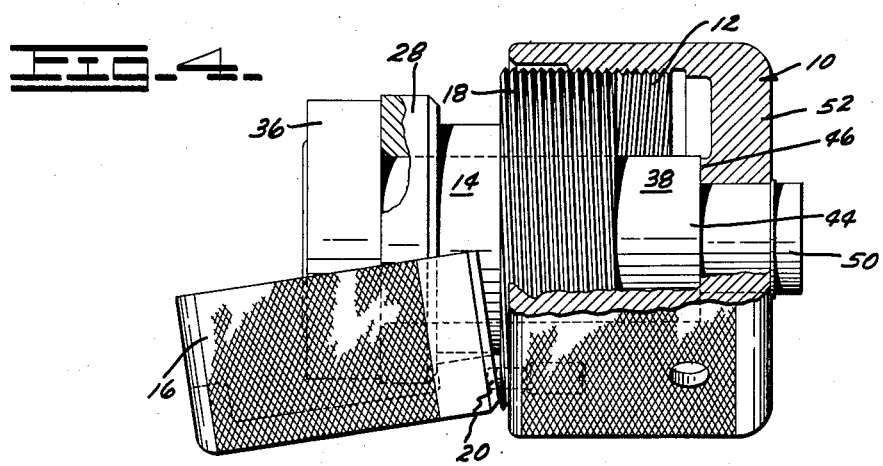
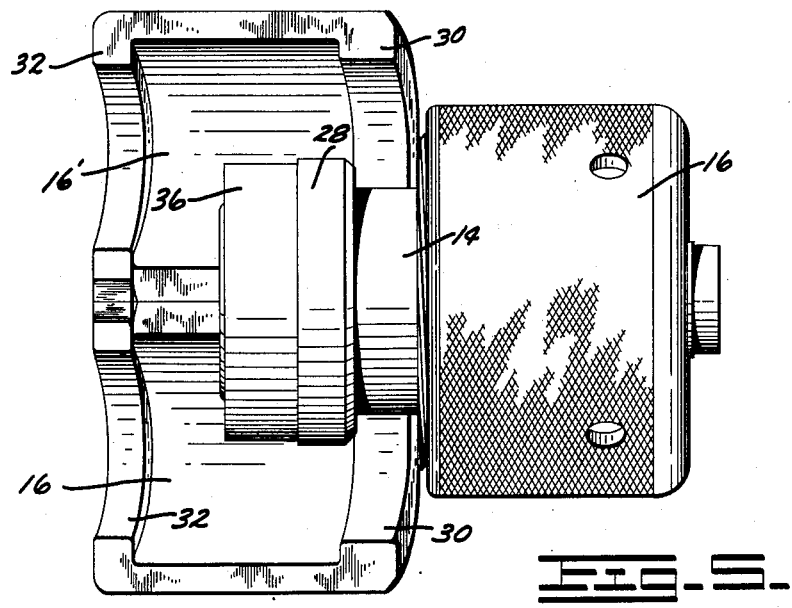
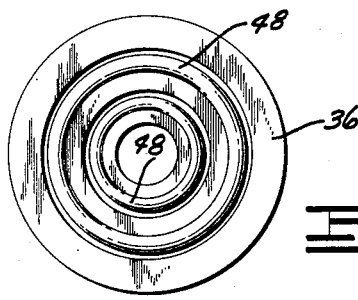

United States Patent Office 2,902,297
Patented Sept. 1, 1959

2,902,297

PRESSURE TESTING ADAPTOR

Willard R. Cowan, Jackson, Mich., assignor to Aeroquip Corporation, Jackson, Mich., a corporation of Michigan Application January 4, 1956, Serial No. 557,261

1 Claim. (Cl. 285—88)

This invention relates to a pressure testing adaptor with which a fluid conductor can be fitted to a pressure fluid supply point for testing the ability of the conductor to conduct the pressure fluid. In particular, the invention is concerned with a pressure testing adaptor which can be employed to hold the flanged end of a tube bend sealed against a header part and with respect to a fluid supply opening in said part.

An object of the invention is to provide an adaptor of the character referred to with which the fluid conductors can be easily and quickly assembled for testing and be held upon the adaptor in a fluid sealed condition.

Another object of the invention is to provide an adaptor which is capable of receiving fluid conductor tube bends having end flanges of varying size.

A pressure fluid adaptor according to the invention comprises a body part carrying an axially adjustable fluid conduit section against which one end of a conductor tube to be tested can be held sealed by the action of a divided coupling sleeve which is capable of being made to embrace the conductor tube and hold the tube firmly upon the body part of the adaptor in position to permit pressure fluid to be admitted to flow through the conductor tube from said conduit section portion of the adaptor.

The fluid sealed holding of the conduit section upon the adaptor is brought about by producing relative axial motion between an outer part of the adaptor body part and an inner part thereof, in which inner part the conduit section has freedom of limited axial adjustment to permit the conductor tube to be tested to be brought into firmly sealed position within the adaptor and by which inner part the resulting axial thrust is capable of being absorbed by the relatively substantial adaptor body part.

The above and other objects of the invention, residing in the construction, arrangement and combination of parts will appear clear from consideration of the following description of one practical form of the invention, by way of example, with reference to the accompanying drawings and from the appended claim.

Figure 1:
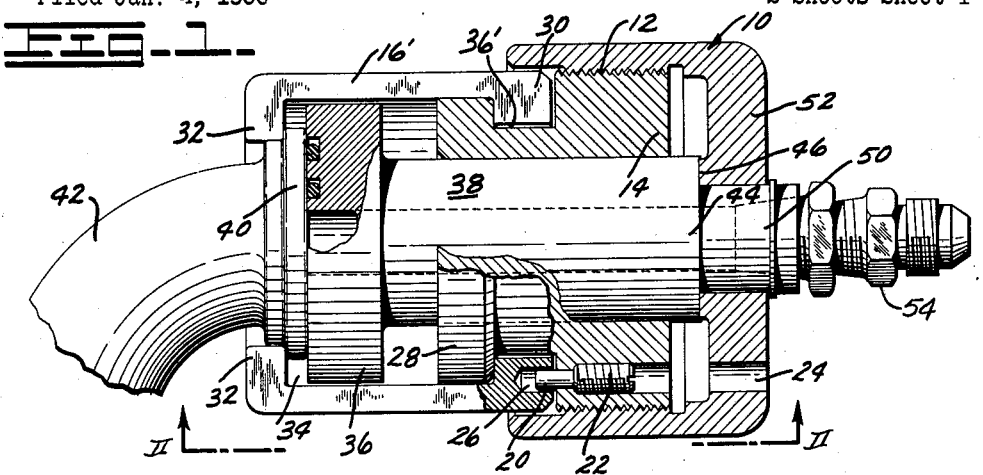
Figure 2:
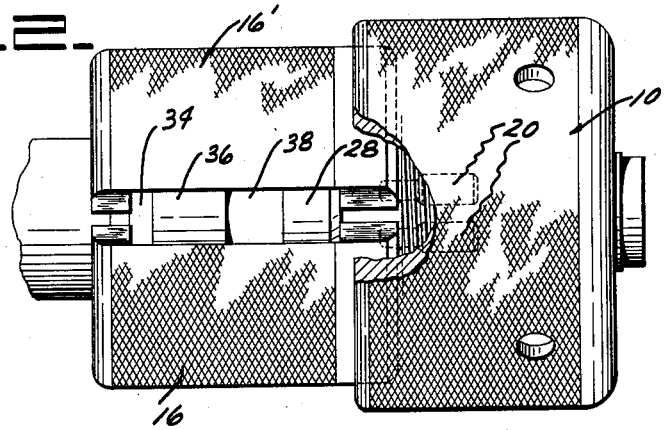
Figure 3:
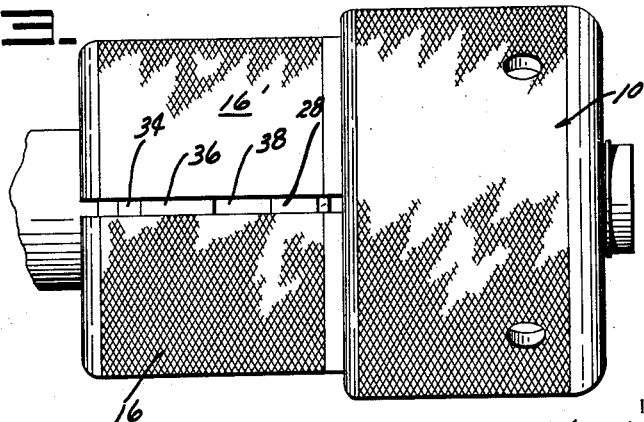

In the accompanying drawings:

Fig. 1 is longitudinal section of an adaptor according to the invention, shown with a fluid conductor tube bend assembled thereon for testing, the conductor being shown broken-away at one end, Fig. 2 is an underneath plan view of Fig. 1, looking in the direction of the arrows II—II, Fig. 3 is a top plan view of Fig. 1, Fig. 4 is a part section, part elevation view of the adaptor itself looking upon one side of the divided and pivotally mounted coupling sleeve, with this sleeve in opened position prior to application of the tube bend, Fig. 5 is a top plan view of Fig. 4, and Fig. 6 is an end view.

In the drawings, 10 indicates a hollow cylindrical body part having internal screw-threading 12 and an inner portion 14 disposed to have relative axial motion with respect to the corresponding end of a coupling sleeve composed of two semi-cylindrical parts 16, 16' each pivotally mounted at one end upon said inner body part 14, which part is mounted within the body part 10 by having external screw-threading 18 engaged with said screw-threading 12.

A somewhat loose hinge mounting for each adaptor coupling part is effected by a hinge pin 20 on a grub screw 22 (Fig. 1) accessible through an opening 24 and secured in the part 14 so that the pin engages an elongated opening 26 in the coupling sleeve parts 16, 16'.

The inner body part 14 has a radial flange 28 which forms an abutment with respect to a radial flange 30 on each of the coupling parts 16, 16', these parts having further flanges 32 at their opposite and outer ends, which flanges 32 in the closed position of the said parts, seen in Figs. 1–3, define, with the flanged head 36 of pressure fluid conduit section 38, a space 34. The overall diameter of this space is chosen so that it is capable of accommodating a standard range of tube flanges.

Conduit section 38 is mounted for limited axial sliding motion within the body part 14 and is also rotatable with respect thereto. The flanged head 36 forms a pressure pad for fluid sealed engagement of the flanged end 40 of a conductor tube 42, the pressure capacity of which it is desired to test and which is shown as a tube bend. Conduit section 38 presents an end surface 44 for engagement against the annular interior surface 46 of the body part 10.

Pressure pad 36 has concentric facial annuli containing fluid pressure sealing rings 48 for sealing against the flanged end 40 of tube bend 42. At its opposite end, conduit 38 has a reduced portion 50 which has a sliding fit with respect to a central opening in the body part end wall 52 and has an end nipple 54 by which the conductor tube 38 can be connected to a source of pressure fluid.

In operation, to connect tube bend 42 to the adaptor device for testing, and with the parts as seen in Figs. 4 and 5 flange 40 is located behind the flange portions 32 of the coupling parts 16, 16', it being noted that the other flange portions 30 of this coupling parts lie opposite the annular recess formed in the conduit section behind the flanged head 28 of said section. With the parts 20 thus located, the coupling parts are swung inwards to cause them to encompass the flanges 28 and 36 and locate the flange portions 32 of the coupling parts against the tube bend flange 40, with this flange located in the space defined between the flange portions 32 and flange 36. Relative rotation is then produced between body parts 10 and 14 to cause the left-hand end portion of the outer body part to be projected into encompassing relation with respect to the adjacent end portions of the coupling parts and thereby hold these parts closed. As such projection takes place endwise pressure will be exerted against flange 36 by the flange portions 32, with attendant shortening of the space 34 and relative axial motion of conduit section 38 with respect to the inner body part 14.

Relative rotation of the body parts will continue until the tube bend flange is tightly held between flange portions 32 and flange 36, at which time the end 44 of conduit section 38 will be firmly seated against the annular internal surface portion 46 of the outer body part. Accordingly, the end thrust is capable of being absorbed by the substantial body part composed of parts 10 and 14 and the tube bend will be held firmly sealed against the pressure pad 36.

I claim:

A pressure testing adaptor, for fluid conductors having a radial flange for testing their ability to conduct fluid pressure, comprising in combination a conduit section having a cylindrical barrel portion with a radial flange at one end of said barrel portion and a cylindrical portion of reduced diameter at the other end of said barrel portion to provide a radial shoulder, said radial flange of said conduit section presenting an outer radial face for sealing abutment with the radial flange of the fluid conductor to be tested, a sleeve member embracing said barrel portion for axial sliding movement thereon and having a radial groove on the outer surface thereof adjacent one end and an externally threaded portion adjacent its other end, a socket member mounted upon said portion of reduced diameter of said conduit for relative rotation and engaging said shoulder to prevent relative axial movement in one direction, said socket member and said barrel portion presenting an annular recess with said socket member being internally threaded inwardly from the outer end of said recess and having threaded engagement with said sleeve member to effect relative axial movement of said sleeve member within said recess and along said barrel portion upon relative rotation between said socket and sleeve members, a hollow collet having inner and outer cylindrical surfaces terminating in radially inward extending flanges at opposite ends, said collet being in the form of two longitudinally slit semi-cylindrical parts, said collet member in one position embracing said flanged end of said conduit section as well as one end of said sleeve member with the first one of the radial flanges of said collet member being disposed in said groove and telescoping within the outer end of said socket member and the other flange of said collet member being disposed in spaced axial relation to said radial flange of said conduit section to engage back of the flange of the conduit to be tested to clamp the same to the radial flange of said conduit section upon relative rotation between said socket and sleeve in one direction, relative rotation of said socket and sleeve in the other direction axially projecting said sleeve member partially from said recess to radially clear said groove and the flanged end of said collet member located therein with respect to their former telescoping relative within said socket, and a socket in each of said first flanges of said collet members closely adjacent said longitudinal split pivot pin means supported in said sleeve member and projecting into said groove and engaging with the socket in the said first flanges of said collet member to provide a longitudinal hinge line adjacent one side of said collet member coinciding substantially with the longitudinal split of said split parts, said hinge line being within said groove whereby said split parts are held in axial and radial alignment with said conduit section and said sleeve member when hinged into an open position to remove or receive the fluid conductor being tested.

References Cited in the file of this patent

UNITED STATES PATENTS

| | | |
|---|---|---|
| 266,862 | Meyrick | Oct. 31, 1882 |
| 976,787 | Donnolley | Nov. 22, 1910 |
| 998,352 | Kublin | July 18, 1911 |
| 1,111,991 | Bremer | Sept. 29, 1914 |
| 1,811,200 | Kainer | June 23, 1931 |
| 1,815,660 | Wolker | July 21, 1931 |
| 2,423,239 | Housekeeper | July 1, 1947 |
| 2,645,506 | Sturgis | July 14, 1953 |
| 2,684,839 | Rice | July 27, 1954 |

FOREIGN PATENTS

| | | |
|---|---|---|
| 6,822 | Sweden | 1895 |
| 728,503 | France | Apr. 12, 1932 |